US006966512B1

(12) United States Patent
Simpson (10) Patent No.: US 6,966,512 B1
(45) Date of Patent: Nov. 22, 2005

(54) SYSTEM FOR UN-BALING FARM PRODUCTS (76) Inventor: T. Whipple Simpson, Rte. 2, Box247-F, Cochran, GA (US) 31014

(*) Notice: Subject to any disclaimer, the term of this patent is extended or adjusted under 35 U.S.C. 154(b) by 175 days.

(21) Appl. No.: 10/412,461

(22) Filed: Apr. 11, 2003

Related U.S. Application Data (60) Provisional application No. 60/441,092, filed on Jan. 17, 2003.

(51) Int. Cl.⁷ .............................................. B02C 19/12
(52) U.S. Cl. ..................................... 241/200; 241/605
(58) Field of Search ................................ 241/200, 605

(56) References Cited

U.S. PATENT DOCUMENTS

| 3,208,491 | A | * | 9/1965 | Bliss | ..................... | 241/186.35 |
| 3,353,947 | A | | 11/1967 | Kramer | | |
| 3,926,378 | A | | 12/1975 | Ryan | | |
| 4,034,920 | A | | 7/1977 | Bradley | | |
| 4,083,501 | A | * | 4/1978 | Ryan | ................... | 241/101.762 |
| 4,266,899 | A | | 5/1981 | Skeem | | |
| 4,498,830 | A | | 2/1985 | Seymour | | |
| 4,741,656 | A | | 5/1988 | Bishop | | |
| 4,982,658 | A | | 1/1991 | Knudson | | |
| 5,010,809 | A | | 4/1991 | Williams | | |
| 5,209,413 | A | | 5/1993 | Dwyer | | |
| 5,377,479 | A | | 1/1995 | Wilstrand | | |
| 5,377,481 | A | | 1/1995 | Sibley | | |
| 5,390,777 | A | | 2/1995 | Gage | | |
| 5,479,766 | A | | 1/1996 | Ransom | | |
| 5,515,961 | A | | 5/1996 | Murphy | | |
| 5,540,144 | A | | 7/1996 | Schrag | | |
| 5,573,190 | A | * | 11/1996 | Goossen | ...................... | 241/27 |
| 5,661,961 | A | | 9/1997 | Westhoff | | |
| 5,687,643 | A | | 11/1997 | Felts | | |
| 5,752,374 | A | | 5/1998 | Allworden | | |
| 5,833,043 | A | | 11/1998 | Schmidgall | | |
| 5,927,188 | A | | 7/1999 | Gombos | | |
| 6,227,468 | B1 | * | 5/2001 | De Baat | ...................... | 241/30 |
| 6,685,120 | B2 | * | 2/2004 | Grellner | ..................... | 241/301 |

* cited by examiner

Primary Examiner—Mark Rosenbaum
(74) Attorney, Agent, or Firm—Richard C. McComas (57) ABSTRACT An un-baling system for transforming substantially rectangular bales of farm product into smaller substantiality rectangular sized bales of farm products. The un-baling system incorporates a first rail mounted conveyor subsystem connected to a first rail mounted conveyor-thrasher subsystem. The first rail mounted conveyor-thrasher subsystem is connected to a platform conveyor subsystem in such a way as to enable the first rail mounted conveyor subsystem to convey the farm product to the first rail mounted conveyor-thrasher subsystem wherein the farm product is thrashed. The thrashed farm product is gravity fed onto the platform conveyor subsystem. The platform conveyor subsystem then feeds the thrashed farm product into the baling machine. A plurality of un-baling systems may be ganged together to further increase the volume of production in transforming large substantially rectangular bales of farm products into smaller substantiality rectangular sized bales of farm products.

12 Claims, 11 Drawing Sheets

SYSTEM FOR UN-BALING FARM PRODUCTS

This application claims the benefit of U.S. Provisional Application No. 60/441,092 filed on Jan. 17, 2003.

FIELD OF THE INVENTION

The invention relates, in general, to a system for un-baling farm products. In particular, the invention relates to a system for transforming large substantially rectangular bales of farm products into substantially smaller rectangular sized bales of farm products. More particularly, the invention relates to a system of conveyors and adjustable thrashing mechanisms working in concert with a plurality of hydraulic motors under the control of an operator to transform large substantially rectangular bales of farm products into substantially smaller rectangular sized bales of farm products.

BACKGROUND OF THE INVENTION

The baling of farm products along with farming has changed over the years. At the turn of century the number of farmers or farm workers, as compared to the number of industry or factory workers, was quite large. There was a large segment of the labor force actively engaged in farming and many were engaged in the baling of farm products. Farming was labor intensive and there was a large labor force available to bale farm products. The cost of labor was relatively low compared to the cost of the baled farm product. As the economy expanded the need for factory workers increased. Competing resources drew from the large labor pool thus draining the available farm labor from the labor pool.

As the labor pool shrank the need to mechanize farming increased to provide the same or increased productivity with less direct farm labor. One solution to mechanize farming is to store farm products in a compact state. For example, large volumes of farm product such as hay may be harvested directly from the windrows in the fields. Large volumes of hay are tightly compacted into large substantially rectangular bales. The hay may then be stored and later re-baled into a more workable or convenient bale size. The economies of scale in this approach are self-evident. The bigger the substantially rectangular bales of hay the lower the labor cost of an individual rectangular bale.

To preserve the economies of scale, the un-baling of the farm product must be done by a labor saving re-baling machine. Attempts in the past have been made to preserve the economies of scale by un-baling the farm product into a hopper. The hopper would then feed the farm product into a chamber. The chamber would grind and mix the farm product prior to its being formed into smaller sized bales. The caveat to this approach is that not all large rectangular bales of farm product are compacted with the same consistency. Farm products may be harvested at various times during the harvest season and under various climatic conditions. The large rectangular bales of farm product may be in storage for various lengths of time before being re-baled. Large rectangular bales of farm product of various consistencies may stall or choke the mixer or grinder thus requiring labor to service the machinery involved. This effort is high maintenance and does not produce the economies of scale desired in transforming large rectangular bales of farm product into small sized bales.

Other attempts to resolve the problems of efficiently transforming large rectangular bales of farm product into smaller bales include the additions of various chambers in the baling process. The chambers have various types of augers, rollers and thrashers that attempt to separate the farm product prior to compacting it into smaller bales. The caveat to this approach is that the augers, rollers, and thrashers tend to be unidirectional. The variation in large rectangular bales of farm product consistency is not accommodated. If the consistency of the large rectangular bales of farm product is such that it is tightly wound or wet, the unidirection of the augers, rollers, and thrashers do not separate the farm product. The un-separated farm product generally has to be manually removed or manually separated in the chamber before the processing of the large rectangular bales of farm product may continue.

It would be desirable to have a system for baling farm products that would allow a minimum expenditure of labor to operate and produce smaller baled farm products from larger baled farm products. The system would be able to accommodate various consistencies of large baled farm products i.e., tightly wrapped bales, loosely wrapped bales, or wet and matted bales of farm product. The system would also provide multidirectional capabilities to enable an operator of the system to maneuver the large rectangular bales of farm product in the forward or reverse direction. The aerating and thrashing of the farm product would be under operator control thus enabling the operator to accommodate for varying degrees of consistency (as discussed above) disposed within a particular large rectangular bale of farm product. Transforming large rectangular bales of farm products into smaller substantially rectangular sized bales of farm products would no longer rely on labor intensive methods to unfurl the larger baled farm products or on mechanisms primarily designed to grind and compact rather than separate and aerate.

SUMMARY OF THE INVENTION

The farming industry is well aware of the importance of containing cost in the production of farm products. Cost containment and the management of farm labor may very well be the core elements in making a successful harvest. Farmers have a multitude of challenges and adversities facing them every day. These adversities and challenges range from weather, diminishing labor pool, equipment malfunction, and many more to numerous to mention.

The common thread that runs through all of these challenges and adversities is cost containment and management of farm labor. The challenges and adversities the farmer experiences in the course of a season generally determine whether the farmer will be in business the following season. The need for farm labor is seasonal. Farm labor generally peaks one or more times a year during planting and/or harvesting of farm products. Harvesting of farm products generally occurs in a short time period and amassing the farm labor to harvest crops all at the same time is not practical or possible. The problem, of course is cost, containment and management of farm labor.

The present invention provides a solution to cost containment and management of farm labor after the harvest season. The present invention provides the farmer with a means to very quickly process farm products that have been harvested in bulk and stored at various times during the year. An example of harvesting a farm product in bulk is the well-known process of harvesting hay by compacting it into large substantially rectangular bales rather than into smaller more traditional size bales. The economies of scale are self evident. The harvesting of farm products in bulk reduces the over all cost of harvesting and reduces the dependency on great numbers of farm laborers i.e., cost containment and management of farm labor.

The present invention transforms bulk farm products like large substantially rectangular bales of hay that were stored or recently harvested into more suitably sized bales. The present invention is a farm product un-baling system comprising a plurality of subsystems. The subsystems of the present invention are a first rail mounted conveyor subsystem, a first rail mounted conveyor-thrasher subsystem, a spring-loaded retarding mechanism, a platform conveyor subsystem and a baling machine.

The first rail mounted conveyor subsystem is mechanically connected in-line to the first rail mounted conveyor-thrasher subsystem. The first rail mounted conveyor-thrasher subsystem is mechanically connected at a right-angle to the platform conveyor subsystem which is mechanically connected in-line with the baling machine. The spring loaded retarding mechanism is suspended over and connected to the first rail mounted conveyor-thrasher subsystem. A plurality of un-baling systems may, if desired, be ganged together to increase the economies of scale of un-baling large substantially rectangular bales of farm product and then re-baling into smaller sized rectangular bales.

A loading conveyor subsystem may, if desired, be connected to the present invention to aid in loading the suitably sized farm product bales onto the truck. The conveyor subsystem is a freestanding pivotal conveyor with a telescoping adjustable extension. The movement of the conveyor subsystem allows repositioning of the conveyor during the loading of the suitably sized farm product bales onto the truck.

In operation, a large substantially rectangular bale of farm product is positioned on the first rail mounted conveyor subsystem and/or the subsequent second rail mounted conveyor subsystem with the bale facing forward as determined by the clockwise curvature of the lower portion of the bale. The bottom portion of the bale engages the first rail mounted conveyor subsystem. The clockwise curvature is facing towards the first rail mounted conveyor-thrasher subsystem. The operator commands the first rail mounted conveyor subsystem to propel the substantially rectangular bale forward. The forward end or front end of bale engages the spring-loaded retarding mechanism. The spring-loaded retarding mechanisms holds the top portion of the bale of farm product in-place as the first rail mounted conveyor-thrasher subsystem engages the lower portion of the bale of farm product.

The first rail mounted conveyor-thrasher subsystem may, if desired, be pivoted in relation to the first rail mounted conveyor subsystem to enable the operator to select the position for the first rail mounted conveyor-thrasher subsystem that is best suited for the particulate comprising the bale of farm product. Under operator control, the substantially rectangular bale of farm product begins to break apart as it is propelled towards the thrashing action of the first rail mounted conveyor-thrasher subsystem. After the thrashing action the un-baled and thrashed farm product is gravity fed to the platform conveyor subsystem. The platform conveyor subsystem propels the thrashed farm product towards the baling machine wherein the baling machine transforms the thrashed farm product into suitably sized bales. The suitably sized bales are transported along the loading conveyor subsystem to be loaded by operator onto the truck. If desired the suitably sized bales may be stacked and/or stored in any convenient arrangement or configuration in any convenient facility.

When taken in conjunction with the accompanying drawings and the appended claims, other features and advantages of the present invention become apparent upon reading the following detailed description of embodiment of the invention.

BRIEF DESCRIPTION OF THE DRAWINGS

The invention is illustrated in the drawings in which like reference characters designate the same or similar parts throughout the figures of which.

DETAILED DESCRIPTION

Before describing in detail the particular improved system for baling farm products in accordance with the present invention, it should be observed that the invention resides primarily in a novel structural combination of conventional farm equipment, discrete subsystems or subassembly components, associated control of the aforementioned farm equipment and components, and not in the particular detailed configuration thereof. Accordingly, the structure, command, control and arrangement of these conventional components and subassemblies have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein.

Figure 1:
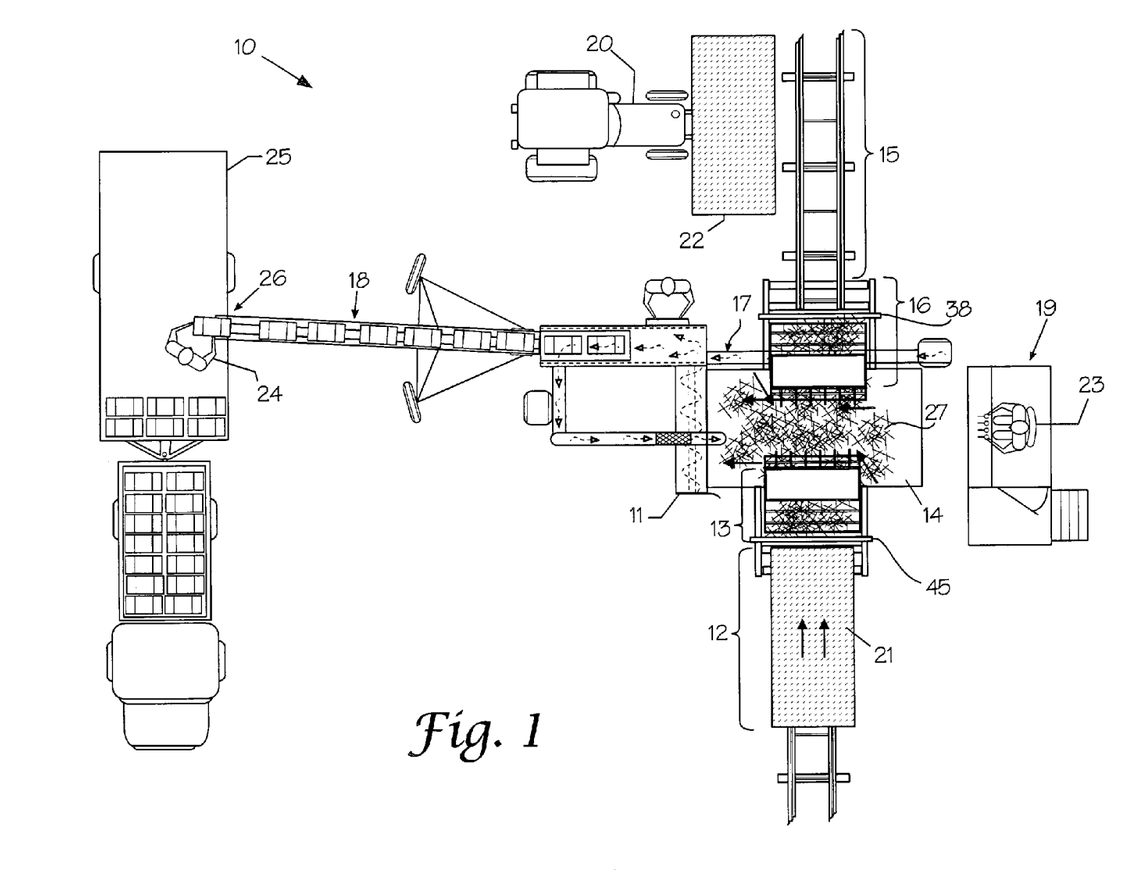
FIG. 1 illustrates a top level systems view diagram of the present invention.

For example, a farm product baling machine 11, FIG. 1 has numerous connections to the present invention 10. Various portions of the baling machine's 11 connections to the present invention 10 have been simplified in order to emphasize those portions that are most pertinent to the invention. Thus, the top level system diagram and schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

An overview of the present invention 10, FIG. 1: The present invention 10 is a system for un-baling farm product. Any type of farm product that may be baled may be used in conjunction with the present invention 10. An example of farm product is a forage plant cut and dried for animal feed commonly referred to as hay. The hay, in this example, has been previously baled into substantially large rectangular bales. Any size of rectangular bale or consistency of the particulate forming the farm product may be used with the present invention 10. The farm product delineated herein and generally baled is the product of pressing particulate matter by a plunger mounted within a baling machine's compacting chamber. The plunger has a repetitive action i.e., the plunger moves forward pressing the particulate matter into flakes. The size of the flakes are derived from the plunger interval. For example, a plunger interval of 90 strokes per minute produces a flake of approximately 4 inches in depth. The present invention 10 may, if desired, process flakes produced from plunger intervals of 50 to 120 strokes per minute. The plurality of flakes produced by this method are aligned front to back to form a complete bale of farm product.

Each flake produced by the plunging action produces a discernable curvature on the bottom portion of the bale. For example, the farm product bale 21, FIG. 2b comprises a plurality of front to back aligned flakes 57. Each flake's lower portion has a discernable clockwise curvature 58. The clockwise curvature 58 is produced from the plunger motion in concert with the plunging chamber. This particular rectangular farm product bale 21 size is eight feet by four feet by three feet with 4-inch flakes 57 wherein all flakes 57 have a clockwise curvature 58 on the bottom portion. The size of the bale is selected for shipping purposes i.e., road and bridge weight and height restrictions. Further, the rectangular farm product bale 21 was baled in this selected size to reduce labor costs. The rectangular farm product bale at its final destination is re-baled into smaller bales for handling purpose.

The farm product un-baling system of the present invention 10, FIG. 1 may, if desired, be composed of any number of individual subsystems or subassemblies. If desired, the present invention 10 may be expanded into multiple systems for un-baling farm products with all systems controlled from one system control station 19. The present invention 10 may, if desired, be mounted onto any surface that allows the normal operation. The present invention 10 may, for example, be located in the fields where the harvested farm products can be baled. The present invention 10 may also be located in a barn or shed wherein farm product is transported to the present invention for processing.

The subsystems of the present invention 10, FIG. 1 are a first rail mounted conveyor subsystem 12, a first rail mounted conveyor-thrasher subsystem 13, a spring-loaded retarding mechanism 45, a platform conveyor subsystem 14 and a baling machine 11. The first rail mounted conveyor subsystem 12 is mechanically connected in-line to the first rail mounted conveyor-thrasher subsystem 13. The first rail mounted conveyor-thrasher subsystem 13 is mechanically connected at a right-angle to the platform conveyor subsystem 14 which is mechanically connected in-line with the baling machine 11. The spring loaded retarding mechanism 45 is suspended over and connected to the first rail mounted conveyor-thrasher subsystem 13.

A second rail mounted conveyor subsystem 15, FIG. 1 is a mirror image of the first rail mounted conveyor subsystem 12. The mounting or positioning of the second rail mounted conveyor subsystem 15 may, if desired, be identical to and oppositely spaced from the position or mounting of the first rail mounted conveyor subsystem 12. The second rail mounted conveyor-thrasher subsystem 16 is a mirror image of the first rail mounted conveyor-thrasher subsystem 13. The mounting or positioning of the second rail mounted conveyor-thrasher subsystem 16 may, if desired, be identical to and oppositely spaced from the position or mounting of the first rail mounted conveyor-thrasher subsystem 13. A second spring-loaded retarding mechanism 38 is positioned in concert with the second rail mounted conveyor-thrasher subsystem 16. The functioning of the two spring-loaded retarding mechanisms 38 and 45 respectively, is the same. The second rail mounted conveyor subsystem 15 and the second conveyor-thrasher 16 provide additional processing support for the farm product 22, i.e., baled farm product 22 may be loaded into the first rail mounted conveyor subsystem 12 and the baled farm product 21 may be loaded onto the second rail mounted conveyor subsystem 15.

The baling machine 11, FIG. 1 re-bales the farm product bale 21 and/or 22 into suitably sized farm product bales 26 for handling by an operator 24 or transporting via any convenient vehicle such as a truck 25. The baling machine 11, FIG. 1 may, if desired, be any type of baling mechanism that receives the un-baled farm product 27 from the platform conveyor subsystem 14 and transforms or bales the un-baled farm product 27 into suitably sized farm product bales 26. The size of the bales is a matter of convenience and may range in size depending on the intended storage and transportation of the baled farm products 21 or 22. A typical example of baling machine 11 is manufactured by John Deere, Model 348.

A loading conveyor subsystem 18, FIG. 1, may, if desired, be connected to the present invention 10 to aid in the loading of the suitably sized farm product bales 26 onto the truck 25. The conveyor subsystem 18, FIG. 1, is a freestanding pivotal conveyor with a telescoping adjustable extension. The movement of the conveyor subsystem 18 allows repositioning of the conveyor during the loading of the suitable size farm product bales 26 onto the truck 25.

The operational control of the present invention 10, FIG. 1, is provided by a plurality of driving or propelling mechanisms attached or connected to the various subsystems, conveyors, pumps and the like. Any number of driving or propelling mechanisms may be used in conjunction with the normal operation of the present invention 10 to allow it to operate normally. The driving or propelling mechanisms may, if desired, be electrical, mechanical, hydraulic or any other suitable forms of power that allow the present invention 10 to operate normally.

In operation the above discussed present invention 10, FIG. 1 has an operator 23 positioned at the controls of system control station 19 that command the first rail mounted conveyor subsystem 12 to begin moving the farm product bale 21. The farm product bale 21 is conveyed to the first rail mounted conveyor-thrasher subsystem 13 where it is thrashed. The operator 23 may, if desired, manipulate the controls of the system control station 19 to actively change the conveying motion of the first rail mounted conveyor subsystem 12 and the first rail mounted conveyor-thrasher subsystem 13 from the forward to a reverse direction to aid in the un-baling of the farm product.

The un-baled farm product 27, FIG. 1 is gravity fed to the platform conveyor subsystem 14 where the un-baled farm product 27 is re-baled by the baling machine 11. The platform conveyer subsystem 14, as with the other subsystems disclosed herein, may be commanded or operated in the forward or reverse direction by the operator 23 to aid in the baling of the un-baled farm product 27. The re-baled suitably sized farm product 26 may, if desired, be loaded onto awaiting vehicles or stacked nearby.

A single operator 23, FIG. 1 may, if desired, be positioned at the controls of system control station 19 to operate any combination of the multiple subsystems of the present invention 10. An example of multiple farm product baling is a second rail mounted conveyor subsystem 15 suitably positioned in relation to the conveyor platform subsystem 14. This position may, if desired, be aligned with the first rail mounted conveyor subsystem 12. The second rail mounted conveyor subsystem 15 is mechanically connected to a second rail mounted conveyor-thrasher subsystem 16. The second rail mounted conveyor-thrasher subsystem 16 is mechanically connected to a conveyor platform subsystem 14.

The baled farm product 21, FIG. 1 may, if desired, be retrieved from storage by a farm vehicle or tractor 20. The tractor 20 suitably positions the baled farm product 21 into the second rail mounted conveyor subsystem 15. The operator 23, positioned at the controls of system control station 19, commands the second rail mounted conveyor subsystem 15 to begin moving the baled farm product 22. The baled farm product 22 is conveyed to the second rail mounted conveyor-thrasher subsystem 16 where it is thrashed. The operator 23 may, if desired, manipulate the controls of the system control station 19 to actively move the conveying motion of the second rail mounted conveyor subsystem 15 and second rail mounted conveyor-thrasher subsystem 16 in the forward and reverse directions to aid in the un-baling of the baled farm product 22.

The un-baled farm product 27, FIG. 1 is gravity fed to the platform conveyor subsystem 14 where the farm product 22 is re-baled by the baling machine 11. After re-baling, the baling machine 11 ejects the re-baled farm product 26 from the baler to be loaded onto awaiting vehicles or stacked nearby. The re-baling of the baled farm products 21 and/or 22 may, if desired, be identical. The second rail mounted conveyor subsystem 15 and second rail mounted conveyor-thrasher subsystem 16 are mirror images of the first rail mounted conveyor subsystem 12 and the first rail mounted conveyor-thrasher subsystem 13. They both feed the baled farm product 21 or 22 to the platform conveyor subsystem 14 and into the baling machine 11.

A re-circulating subsystem 17, FIG. 1, may, if desired, be connected to the present invention 10 to alleviate dust and/or particles distributed in or near the operation of the present invention 10. During the normal operation of the present invention 10, farm product particles are generated and may be hazardous to the attending operator's health and destructive to associated machinery.

Any number of the above discussed subsystems of the present invention 10, FIG. 1 may be ganged in series or connected in parallel to un-bale large rectangular farm products and then re-bale the farm products into smaller bales. The present invention 10 as discussed herein may, if desired, be combined with or implemented in conjunction with U.S. Pat. No. 6,152,026. The aforementioned U.S. Pat. No. 6,152,026 and the present invention 10 were invented by the same inventor T. W. Simpson. The U.S. Pat. No. 6,152,026 is included herein by reference.

Figure 2A:
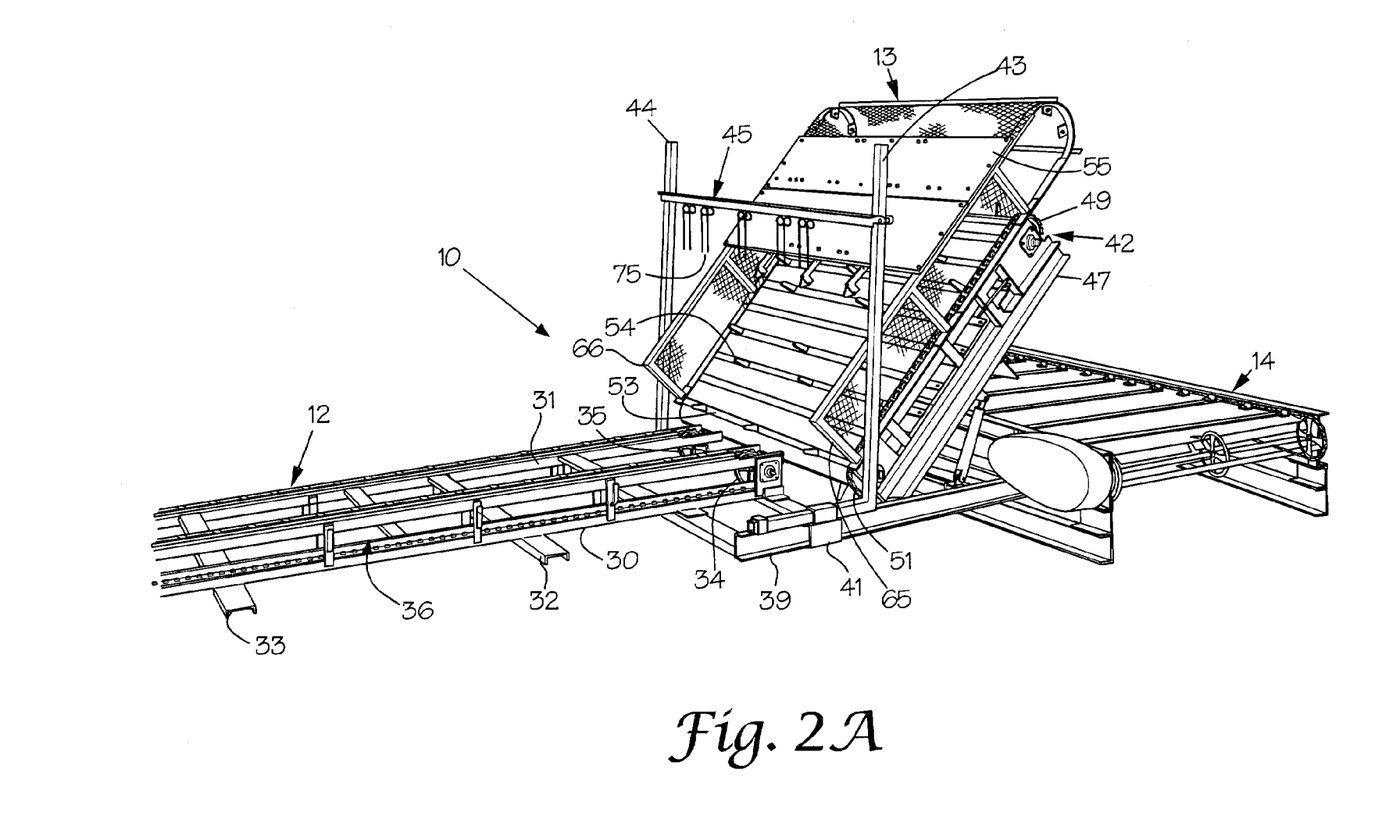
FIG. 2a illustrates a perspective view diagram of an interconnected first rail mounted conveyor subsystem, a first rail mounted conveyor-thrasher subsystem and a platform conveyor subsystem of FIG. 1.

A more detailed discussion of the subsystems of the present invention 10 FIG. 2a: The first rail mounted conveyor subsystem 12 is substantially rectangular comprising two parallel rail housings 30 and 31. The parallel rail housings 30 and 31 extend the length of the first rail mounted conveyor subsystem 12. The parallel rail housings 30 and 31 are mounted to a plurality of cross-members 32 and 33. Although cross members 32 and 33 are the only cross-members illustrated, it is understood any number of cross-members may, if desired, be used to support the parallel rail housings 30 and 31. Each of the parallel rail housings 30 and 31 have a pair of oppositely spaced cog-pulleys 34 and 35. Each pair of oppositely spaced cog-pulleys 34 and 35 has a chain 36 and 37, FIG. 6b positioned about the respective cog-pulleys. Mounted onto each of the chains 36 and 37 are a plurality of spaced apart substantially rectangular tabs 28 each having a top surface 29 and a bottom surface 100, FIG. 6c. Each tab's top surface 29 is facing upwards away from its respective chain position. The baled farm product 21 or 22 is positioned on the plurality of tabs' 28 top surfaces 29. The top surface 29 supports the weight of the baled farm product 21 or 22. The tabs 28 engaged the bottom surface of the baled farm product 21 or 22 and in concert with the chains 36 and 37 propel the bales in a forward or reverse direction along the first rail mounted conveyor subsystem 12. The chains 36 and 37 are hydraulic driven and the forward and reverse movement of the respective chains is under the control of the operator 23. One end of each of the parallel rail housings 30 and 31 respectively is mounted to the first rail mounted conveyor-thrasher subsystem 13.

Figure 5A:
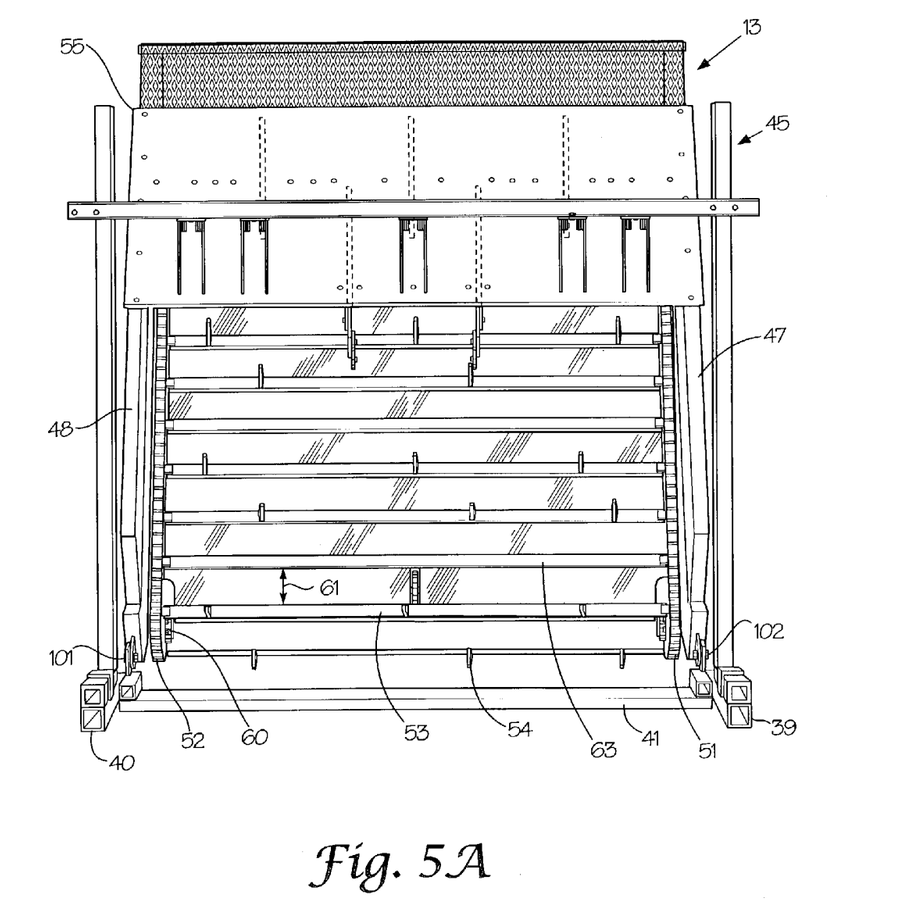

The first rail mounted conveyor-thrasher subsystem 13, FIG. 2a is a substantially rectangular housing 42 pivotally mounted at 101 and 102, FIG. 5a to parallel rails 39 and 40, respectively. The parallel rails 39 and 40, FIG. 5a have a cross-member 41 mounted thereon. The cross-member 41 is the connection vehicle to the first rail mounted conveyor subsystem 12. The substantially rectangular housing 42, FIG. 2a comprises two parallel rail housings 47 and 48. The parallel rail housings 47 and 48 are mounted to a plurality of cross-members that extend the length of the substantially rectangular housing 42. Each of the parallel rail housings 47 and 48 has a pair of oppositely spaced cog-pulleys 49 and 56, FIG. 3c. A chain 51, FIG. 5a is positioned about the first pair of cog-pulleys 49 and 56 of rail housings 47 and a second chain 52 is positioned about the second pair of cog-pulleys 59 (not shown) and 60 of rail housings 48. Mounted onto each of the chains 51 and 52 is a plurality of spaced apart slats 53, FIG. 5a. The spacing 61, between the slats 53 may, if desired, be any convenient distance. The spaced apart slats 53 are mounted parallel to the direction of travel of the conveyor. The conveyor comprising a plurality of flat substantially rectangular panels. Each rectangular panel being hinged to the adjoining rectangular panel. The plurality of hinged together, rectangular panels forms a continuous belt operationally connected to chain 51. Each of the slats 53 has a plurality of outwardly extending teeth 54 that engage the bottom portion of the farm product 21 or 22. The plurality of teeth 54 may, if desired, be arranged in any convenient pattern to facilitate the unbaling of the farm product 21 or 22. Typically, one slat 53 containing a plurality of the teeth 54 is separated from a subsequent slat 53 containing a plurality of the teeth 54 by a blank slat 63. The teeth 54 on any given slat 53 are offset from subsequent rows of teeth 54 on slats 53.

Figures 5B, 5C:
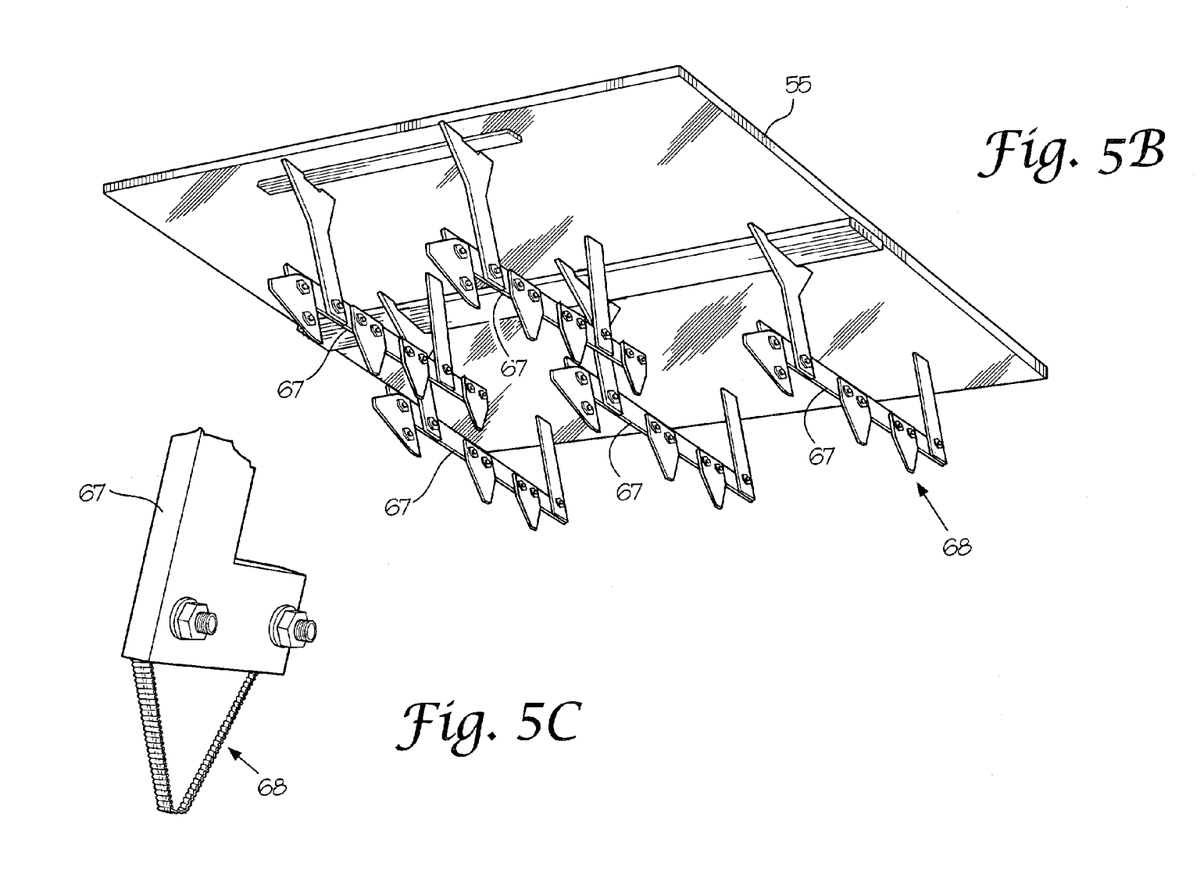

A substantially rectangular panel 55, FIG. 2a is mounted above the plurality of spaced apart slats 53 at a right-angle to a pair of screened sidewalls 65 and 66 mounted onto the substantially rectangular housing 42. The rectangular panel 55, FIG. 5b has a plurality of elongated bars 67 facing the spaced apart slats 53. Each elongated bar 67 has a plurality of serrated teeth 68 mounted thereto. The serrated teeth 68, FIG. 5c are triangular in shape and may, if desired, have any convenient number of serrations disposed thereon. The serrated teeth 68 are selectively positioned along each bar to provide, in concert with the outwardly extending teeth 54, a scissor or shearing action to the farm product thereby thrashing apart the bale 21 or 22.

Figure 3A:
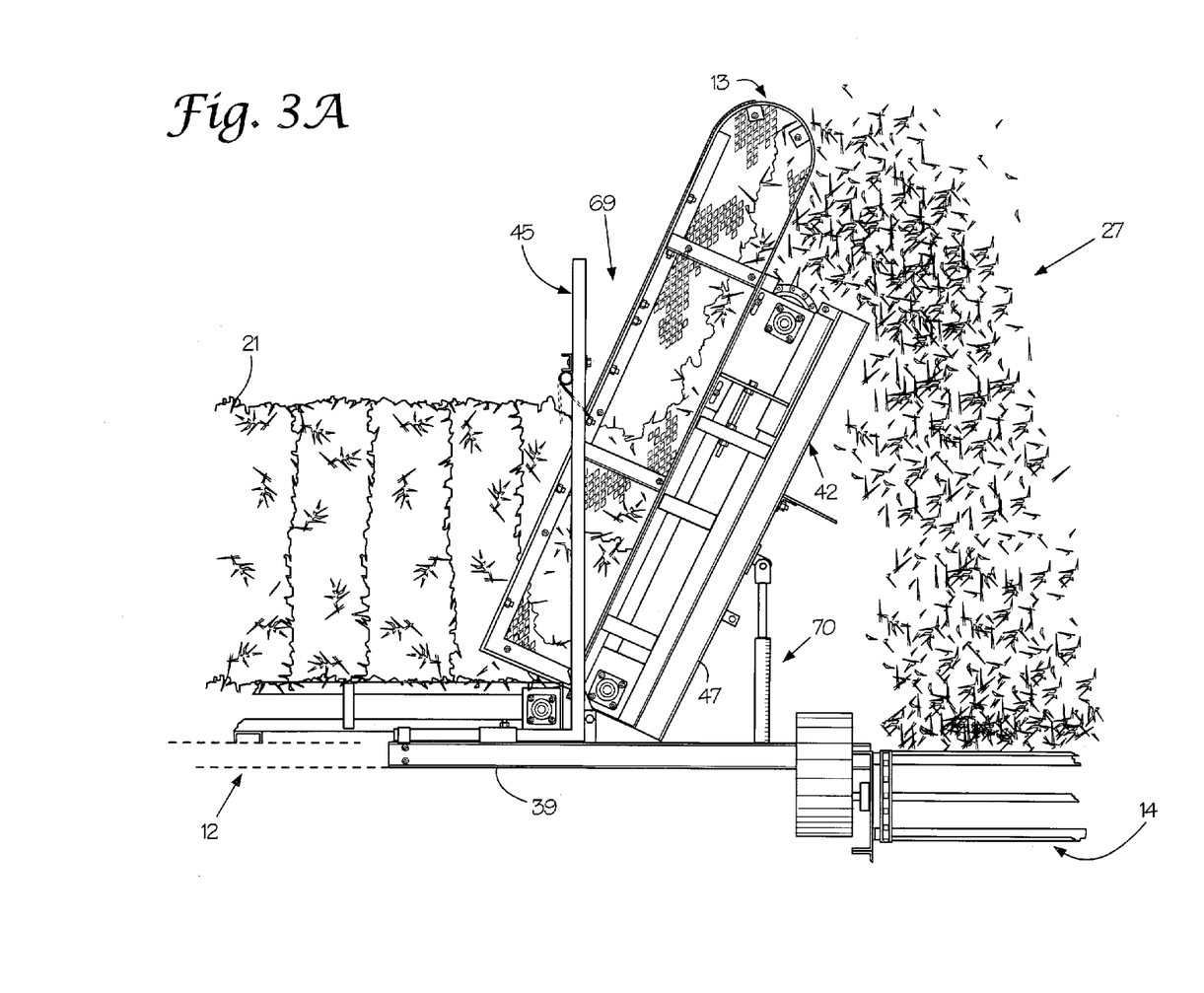
Figure 3B:
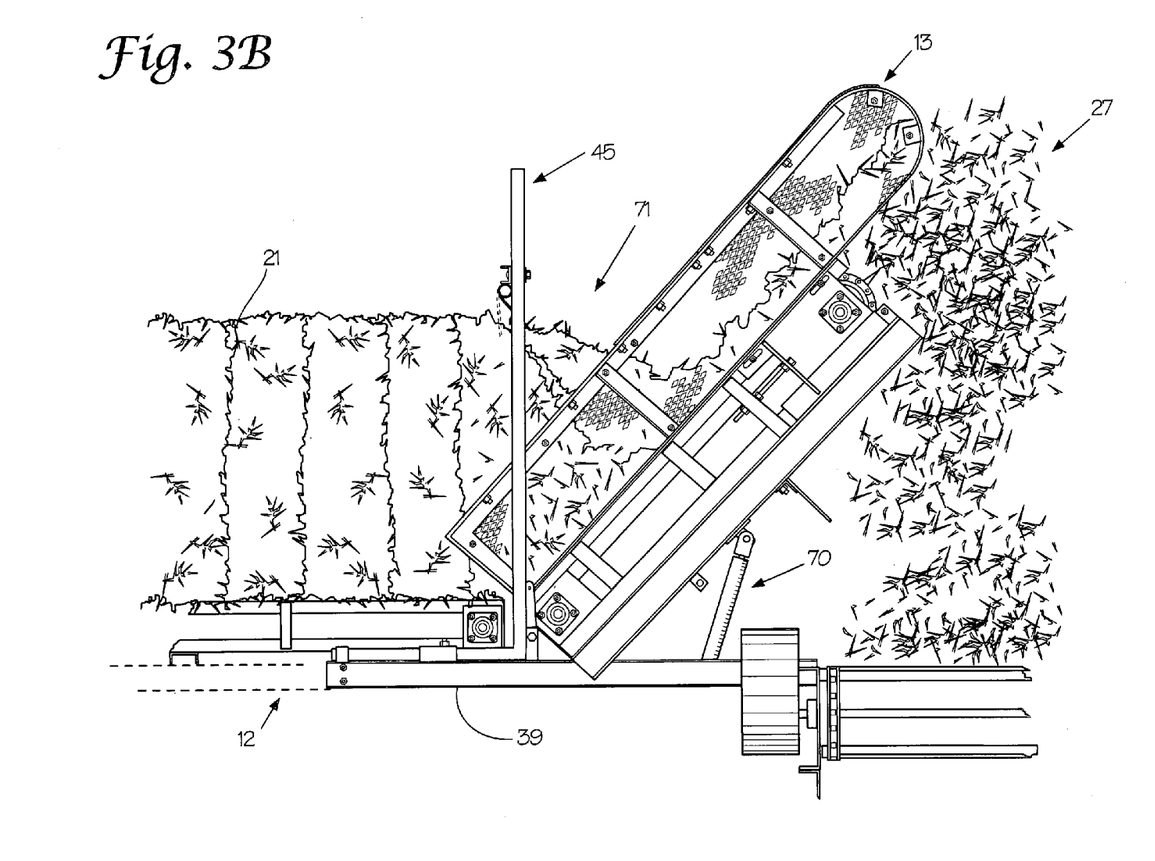
FIG. 3b illustrates a side view diagram of a second position of the first rail mounted conveyor-thrasher subsystem, thrashing the farm product of FIG. 2b.
Figure 3C:
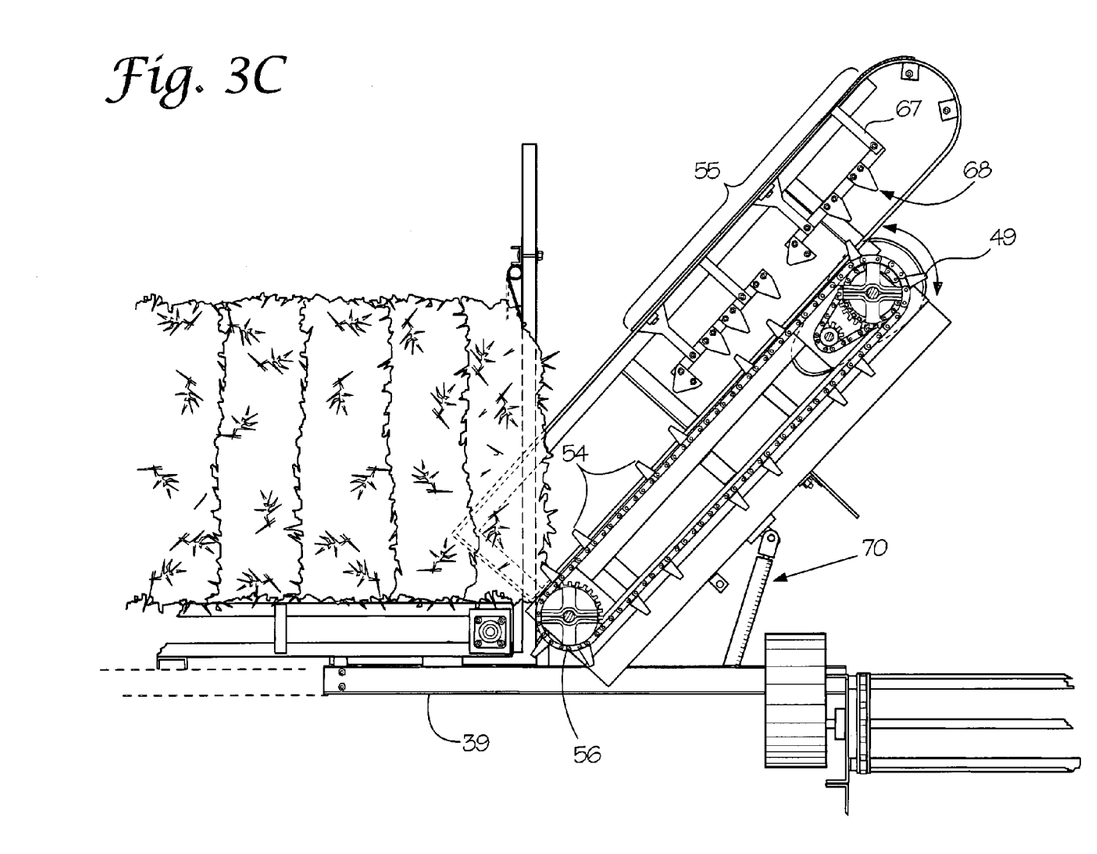
FIG. 3c illustrates a side view diagram of the interior portion of the first rail mounted conveyor-thrasher subsystem of FIG. 2a, FIG. 4a illustrates a front view diagram of a spring-loaded retarding mechanism of FIG. 2a, FIG. 4b illustrates a side view diagram of the spring-loaded retarding mechanism of FIG. 4a, FIG. 4c illustrates a perspective view diagram of the spring-loaded retarding mechanism of FIG. 4a, FIG. 5a illustrates a front view diagram of a first rail mounted conveyor-thrasher subsystem FIG. 2a, FIG. 5b illustrates a perspective view diagram of a rectangular shearing panel of FIG. 5a, FIG. 5c illustrates a perspective view diagram of one of a plurality of serrated teeth of FIG. 5b.

The first rail mounted conveyor-thrasher subsystem 13, FIG. 3a may, if desired, pivot in relation to the first rail mounted conveyor subsystem 12. The first rail mounted conveyor-thrasher subsystem 13 has a pair of pivot actuators 70 connected to the parallel rails 39 and 40. The pivot actuators 70 provide the pivot action to positionally adjust the first rail mounted conveyor-thrasher subsystem 13 from a first position 69 to a second position 71, FIG. 3b or any position therebetween. This pivot action enables the operator 23 to control the angle of engagement between the substantially rectangular housing 42 and the advancing bale of farm product 21 or 22. If the advancing bale of farm product 21 or 22 has a consistency that does not permit maximum positioning of the first rail mounted conveyor-thrasher subsystem 13 in relation to the first rail mounted conveyor subsystem 12 the operator 23 may, if desired, adjust the first rail mounted conveyor-thrasher subsystem 13 to enable maximum un-baling efficiency.

Figure 4A:
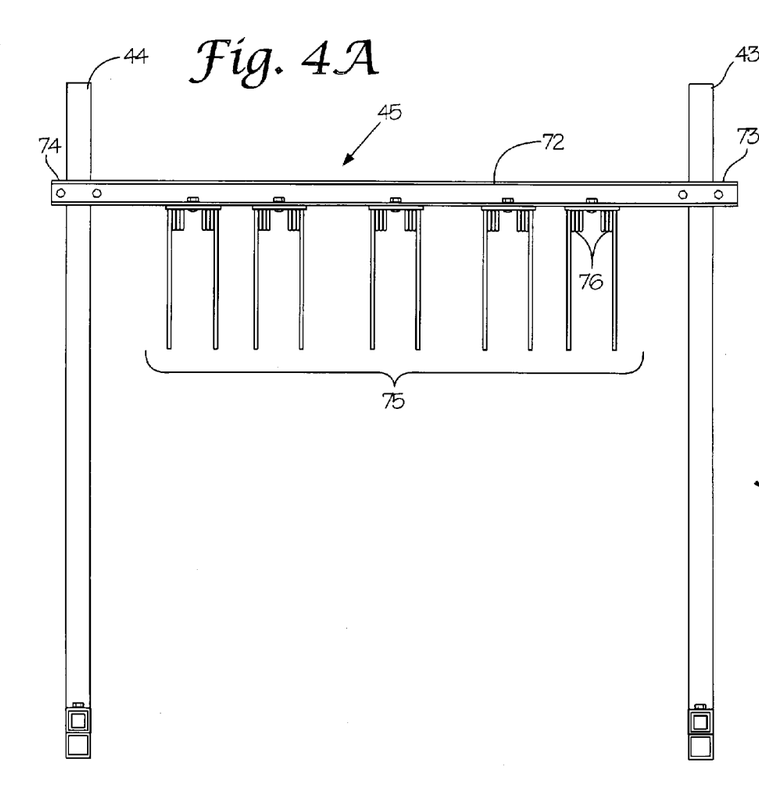
Figure 4B:
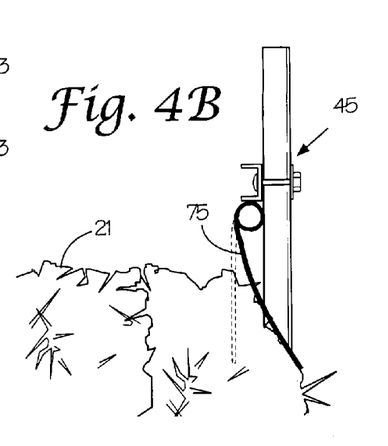
Figure 4C:
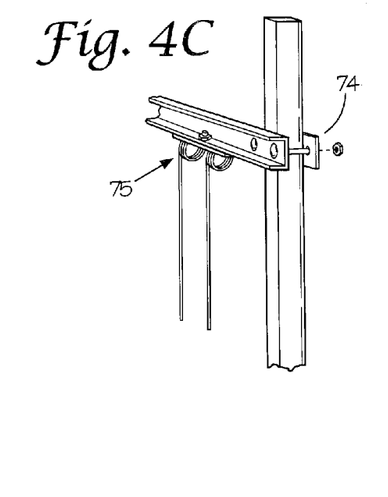

The spring-loaded retarding mechanism 45, FIG. 4a is formed from a pair of substantially L-shaped members 43 and 44 and an adjustable cross-member 72 connected therebetween. The cross-member 72 may, if desired, be adjusted along the upright portion of the substantially L-shaped members 43 and 44 by adjusters 73 and 74, FIG. 4c. The positioning of the adjusters 73 and 74 along the substantially L-shaped members 43 and 44 is selective according to the size of the baled farm product 21 or 22. The spring-loaded retarding mechanism 45 has a plurality of elongated members 75 that are connected along the cross-member 72. Each elongated member 75 has a coiled spring 76 connected to one end. The other ends of the elongated members 75 extends downward in the same plane as the upright portion of the L-shaped members 43 and 44. The spring-loaded retarding mechanism 45 is positioned to selectively engage the top portion of the bale of farm product 21 or 22. For example, as the bale of farm product 21, FIG. 4b advances forward, the leading edge engages the spring-loaded retarding mechanism 45. The spring-loaded retarding mechanism 45 retards the movement of the top portion of the bale of farm product 21 thereby allowing the bottom portion of the bale to engage the teeth 54 of the slats 53.

Figure 6A:
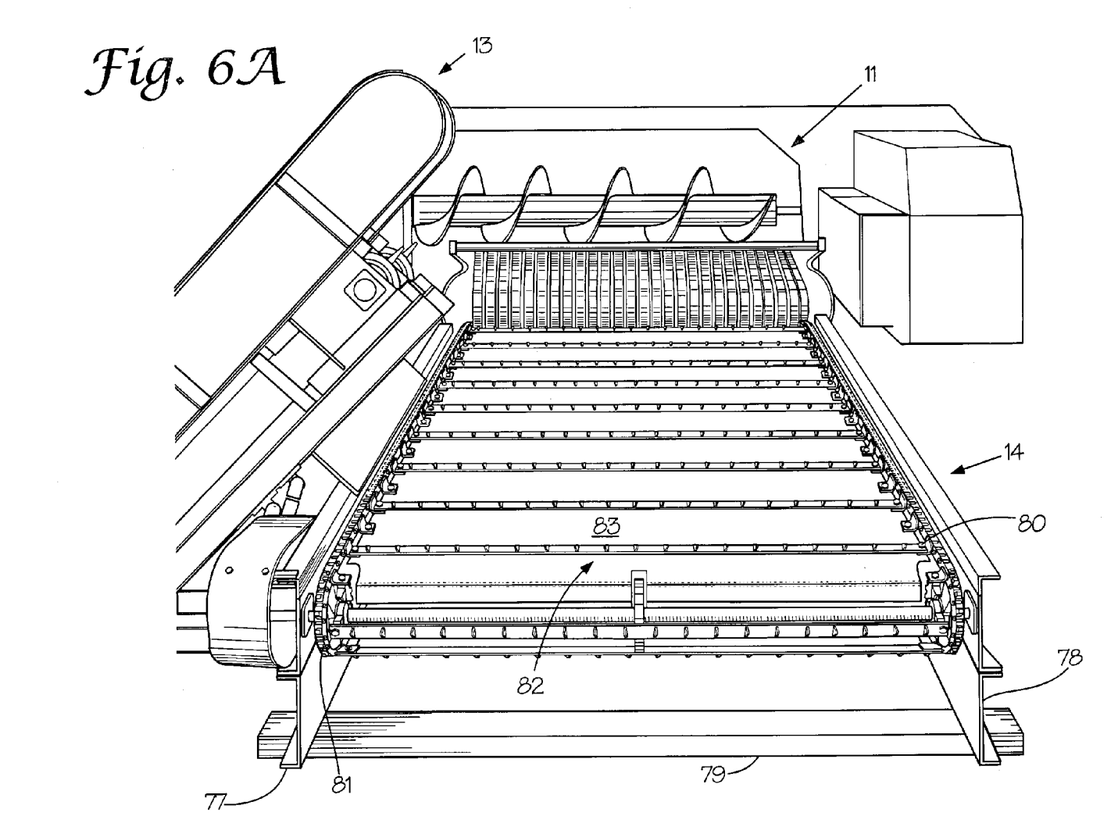
FIG. 6a illustrates a front view diagram of the first rail mounted conveyor subsystem of FIG. 2a, FIG. 6b illustrates a perspective view diagram of the chain drive mechanism of the first rail mounted conveyor subsystem of FIG. 2a, FIG. 6c illustrates a perspective view diagram of one of a plurality of tabs of FIG. 6b.
Figures 6B, 6C:
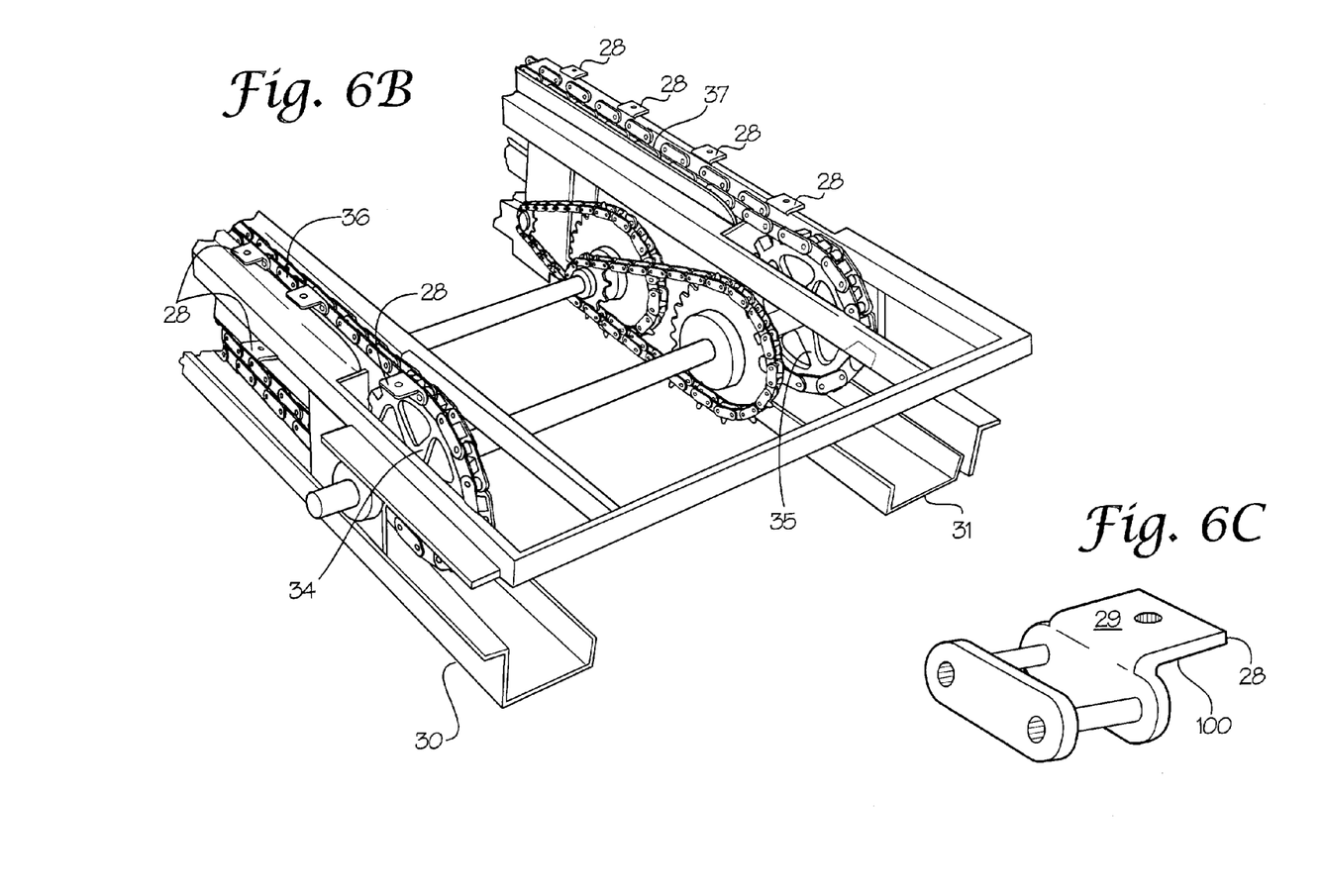

The platform conveyor subsystem 14, FIG. 6a is connected to the first conveyor-thrasher subsystem 13 and the baling machine 11. The first conveyor-thrasher subsystem 13 is mounted on a pair of parallel elongated C-shaped members 77 and 78. The elongated C-shaped members 77 and 78 have a plurality of cross-members 79 connected therebetween supporting the platform conveyor subsystem 14. The platform conveyor subsystem 14 is chain driven by a pair of chains 80 and 81. The chains 80 and 81 are connected to a series of panels 83 forming a continuous belt 82 that extend the length of the platform conveyor subsystem 14. The top surface of the belt 82 receives the thrashed farm product 27. The thrashed farm product 27 is fed into the baling machine 11. The baling machine 11 (as discussed above) transforms the thrashed farm product 27 into suitably sized bales 26.

Figure 2B:
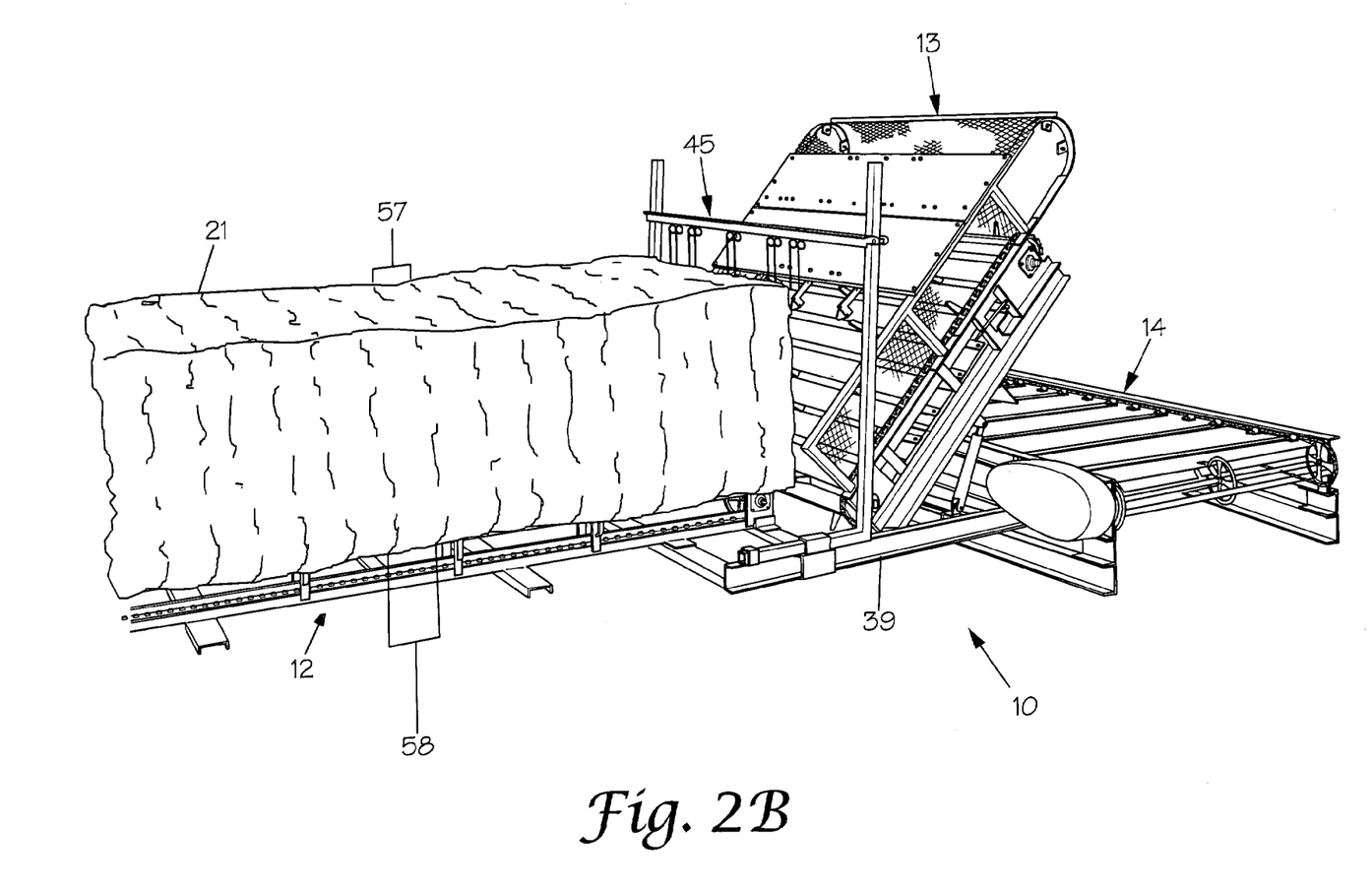
FIG. 2b illustrates a perspective view diagram of a bale of farm product positioned on the first rail mounted conveyor subsystem of FIG. 2a, FIG. 3a illustrates a side view diagram of a first position of the first rail mounted conveyor-thrasher subsystem, thrashing the farm product of FIG. 2b.

In operation, the baled farm product 21, FIG. 2b may, if desired, be positioned on the first rail mounted conveyor subsystem 12 in any convenient manner. Preferably, the baled farm product 21, FIG. 2b is positioned on the first rail mounted conveyor subsystem 12 with the bale's flakes 57 lower portion's clockwise curvature 58 engaging the tabs 28 of the first rail mounted conveyor subsystem 12. The clockwise curvature 58 is facing towards the first rail mounted conveyor-thrasher subsystem 13. The operator 23 commands the forward motion of the first rail mounted conveyor subsystem 12. The tabs mounted onto the continuous chains 36 and 37 of the first rail mounted conveyor-thrasher subsystem 13 engage the farm product bale 21 propelling the farm product forward. The forward end or front end of bale 21 engages the spring-loaded retarding mechanism 45. The spring-loaded retarding mechanisms 45 holds the top portion of the bale of farm product 21 in-place as the first rail mounted conveyor-thrasher subsystem 13 engages the lower portion of the bale of farm product 21 via the slat's 53 plurality of outwardly extending teeth 54. The operator 23 selects a suitable position 69 through 71 that is best suited to the particulate comprising the bale of farm product 21. The flakes 57 are propelled towards the thrashing action of the serrated teeth 68 in concert with the outwardly extending teeth 54. The un-baled and thrashed farm product 27 is gravity fed to the platform conveyor subsystem 14. The platform conveyor subsystem 14 propels the thrashed farm product 27 towards the baling machine 11 wherein the baling machine 11 transforms the thrashed farm product 27 into suitably sized bales 26. The suitably sized bales 26 are transported along the loading conveyor subsystem 18 to be loaded by operator 24 onto the truck 25. If desired the suitably sized bales 26 may be stacked and stored in any convenient arrangement or configuration in any convenient facility.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. A farm products un-baling system, the un-baling system being operationally connected to a farm product baling machine, wherein the farm products being un-baled are substantially rectangular, each substantially rectangular bale comprising a plurality of substantially rectangular flakes uniformly aligned from front to back and detachably secured together, the un-baling system comprising:

11 a) a first rail mounted conveyor subsystem having the first substantially rectangular bale of farm product selectively positioned thereon;
b) a first rail mounted conveyor-thrasher subsystem connectively disposed to said first rail mounted conveyor subsystem;
c) a first spring-loaded retarding mechanism operationally disposed to said first rail mounted conveyor-thrasher subsystem;
d) said first rail mounted conveyor subsystem receiving operational commands for conveying the first substantially rectangular bale of farm product to said first rail mounted conveyor-thrasher subsystem;
e) said first spring-loaded retarding mechanism engaging the top portion of one of the flakes thereby retarding the forward movement of the flake;
f) said first rail mounted conveyor-thrasher subsystem engaging the lower portion of the flake;
g) said first rail mounted conveyor-thrasher subsystem thrashing the lower portion of the flake causing the top portion to disengage from said first spring-loaded retarding mechanism, subsequently said first rail mounted conveyor-thrasher subsystem thrashes the entire flake;

thereby said first rail mounted conveyor subsystem in concert with said first rail mounted conveyor-thrasher subsystem subsequently thrashes the entire first substantially rectangular bale of farm product.

2. A farm product un-baling system as recited in claim 1 wherein said selective position is with the front end of the first substantially rectangular bale of farm product facing said first rail mounted conveyor-thrasher subsystem.

3. A farm product un-baling system as recited in claim 1 wherein said selective positioned is with the back end of the first substantially rectangular bale of farm product facing said first rail mounted conveyor-thrasher subsystem.

4. A farm product un-baling system as recited in claim 2 wherein said selected front end of the first substantially rectangular bale of farm product is derived from the distinctive directional curvature of the particulate composing the lower portion of the substantially rectangular flakes.

5. A farm product un-baling system as recited in claim 1 further comprising a plurality of elongated rectangular tabs mounted onto said first rail mounted conveyor subsystem engaging the bottom portion of the first substantially rectangular bale of farm product.

6. A farm product un-baling system as recited in claim 1 wherein said first rail mounted conveyor subsystem being substantially rectangular, hydraulically controlled and chain driven.

7. A farm product un-baling system as recited in claim 5 wherein said first rail mounted conveyor subsystem chain drive having disposed thereto said elongated tabs.

8. A farm product un-baling system as recited in claim 1 further comprising:
a) a platform conveyor subsystem connected between the farm product baling machine and said first rail mounted conveyor-thrasher subsystem;
b) said platform conveyor subsystem receiving the thrashed farm product; and
c) said platform conveyor subsystem transporting the thrashed farm product to the farm product baling machine to be baled.

9. A farm product un-baling system as recited in claim 8 further comprising:

12 a) a second rail mounted conveyor subsystem having the second substantially rectangular bale of farm product selectively positioned thereon;
b) a second rail mounted conveyor-thrasher subsystem operationally disposed to said second rail mounted conveyor subsystem;
c) said second rail mounted conveyor-thrasher subsystem connectively disposed to said platform conveyor subsystem;
d) a second spring-loaded retarding mechanism operationally disposed to said first rail mounted conveyor-thrasher subsystem;
e) said second rail mounted conveyor subsystem receiving operational commands for transporting the second substantially rectangular bale of farm product to said second rail mounted conveyor-thrasher subsystem;
f) said second spring-loaded retarding mechanism engaging the top portion of the flake thereby retarding the forward movement of the flake;
g) said second rail mounted conveyor-thrasher subsystem engaging the lower portion of the flake;
h) said second rail mounted conveyor-thrasher subsystem thrashing the lower portion of the flake causing the top portion to disengage from said second spring-loaded retarding mechanism, subsequently said second rail mounted conveyor-thrasher subsystem thrashes the entire flake;

thereby said second rail mounted conveyor subsystem in concert with said second rail mounted conveyor-thrasher subsystem subsequently thrashes the entire second substantially rectangular bale of farm product and said platform conveyor subsystem transporting the thrashed farm product to the farm product baling machine to be baled.

10. A farm products un-baling system as recited in claim 9 further comprising a plurality of elongated rectangular tabs mounted onto said second rail mounted conveyor subsystem engaging the bottom portion of the second substantially rectangular bale of farm product.

11. A farm products un-baling system, the un-baling system being operationally connected to a farm product baling machine, wherein the farm products being un-baled are substantially rectangular, each substantially rectangular bale comprising a plurality of substantially rectangular flakes uniformly aligned from front to back and detachably secured together, the un-baling system comprising:
a) a rail mounted conveyor subsystem having the substantially rectangular bale of farm product selectively positioned thereon;
b) a rail mounted conveyor-thrasher subsystem pivotally disposed to said rail mounted conveyor subsystem;
c) a spring-loaded retarding mechanism selectively disposed to said rail mounted conveyor-thrasher subsystem;
d) said rail mounted conveyor subsystem receiving operational commands for conveying the first substantially rectangular bale of farm product to said rail mounted conveyor-thrasher subsystem;
e) said rail mounted conveyor-thrasher subsystem receiving operation commands to pivot to a selected position with respect to said rail mounted conveyor subsystem;
f) said spring-loaded retarding mechanism engaging the top portion of one of the flakes thereby retarding the forward movement of the flake;
g) said first rail mounted conveyor-thrasher subsystem engaging the lower portion of the flake;
h) said rail mounted conveyor-thrasher subsystem thrashing the lower portion of the flake causing the top portion to disengage from said spring-loaded retarding mechanism, subsequently said rail mounted conveyor-thrasher subsystem thrashes the entire flake;

thereby said rail mounted conveyor subsystem in concert with said rail mounted conveyor-thrasher subsystem subsequently thrashes the entire substantially rectangular bale of farm product.

12. A farm products un-baling system as recited in claim 11 wherein said rail mounted conveyor-thrasher subsystem comprises:
 a) a substantially rectangular housing pivotally mounted onto a pair of parallel rails, said parallel rails having connectively disposed therebetween a cross-member, said cross-member being the connection vehicle for said rail mounted conveyor subsystem to said rail mounted conveyor-thrasher subsystem;
 b) a plurality of flat rectangular panels each being hinged together along each long side of said rectangular panel, said hinged flat rectangular panels forming a continuous belt operationally disposed within the confines of said substantially rectangular housing;
 c) a plurality of parallel slats connectively disposed to said continuous belt; said slats having a plurality of outward extending teeth mountably disposed thereon;
 d) a plurality of serrated triangularly shaped teeth oppositely spaced from said continuous belt, said serrated triangularly shaped teeth meshing with said outward extending teeth forming a shearing action; and
 e) said shearing action providing the thrashing of the un-baled farm product.

* * * * *